Dec. 26, 1939.    J. E. MacCONVILLE ET AL    2,184,975
HEAT TREATING CONTROL
Filed Feb. 10, 1938    2 Sheets-Sheet 1

INVENTOR.
JOHN E. MacCONVILLE
NEEL I. COCKLEY
BY JAMES L. WHITTEN
George M. Murchay
ATTORNEY.

Patented Dec. 26, 1939

2,184,975

UNITED STATES PATENT OFFICE 2,184,975

HEAT TREATING CONTROL

John E. MacConville, Glenside, Neel I. Cockley, Philadelphia, and James L. Whitten, Pittsburgh, Pa., assignors to The Brown Instrument Company, Philadelphia, Pa., a corporation of Pennsylvania Application February 10, 1938, Serial No. 189,798

19 Claims. (Cl. 263—52)

The general object of the present invention is to provide improved means for measuring and controlling temperature conditions in furnaces, such as metal annealing furnaces of the intermittent or batch type, and other heat treating furnaces, in which each successively inserted work batch is subjected to predetermined temperature conditions.

While adapted for more general use, the present invention was primarily devised for use in the heat treatment of metal in a furnace of the bell, or removable dome, type, including heating elements which may be in the form of heat radiating combustion chambers supported by the movable bell member, and in which the form and dimensions of the furnace, and the character and disposition of the work are such as to make it desirable to separately measure furnace and work temperatures at several different points and to control the furnace in accordance with the temperatures at more than one of said points, and a primary object of the present invention is to provide a measuring and control system for the above mentioned furnace, in which a single measuring and control instrument is arranged to effect the different measuring and control actions.

Another specific object of the invention is to provide a simple and effective control system, preferably comprising but a single measuring and control instrument, which is adapted to regulate the supply of heat to the furnace in accordance with furnace temperature conditions until the work temperature at one or another of a plurality of work points at which the work temperature is measured, rises to a predetermined value, whereupon the control of the heat supply is automatically made subject to work temperature conditions. Advantageously, the control apparatus includes means for cutting off, or reducing, the supply of heat to the furnace, on the attainment of a certain maximum furnace temperature regardless of the work temperature conditions prevailing at the time.

The invention, in a preferred form, also includes means automatically actuated on an increase in the work temperature to a predetermined value, for thereafter subjecting the work to different predetermined temperatures during different definite portions of a heat treatment period of predetermined extent, ordinarily of two or three hours.

The various features of novelty which characterize the present invention are pointed out with particularity in the claims annexed to and forming a part of this specification. For a better understanding of the invention, however, its advantages and specific objects attained with its use, reference should be had to the accompanying drawings and descriptive matter in which we have diagrammatically illustrated and described a preferred embodiment of the invention.

Of the drawings:

Fig. 1A is a modification of a portion of Fig. 1;

Figure 1:
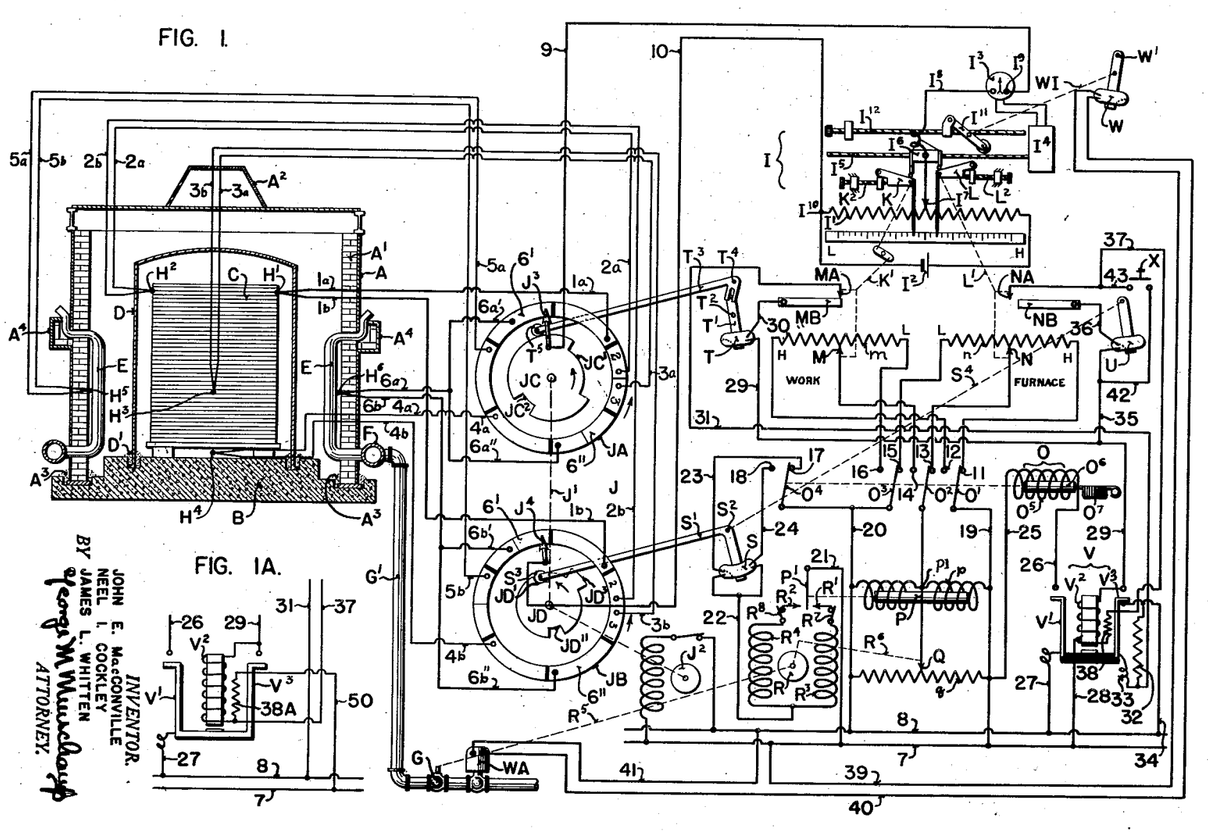
Fig. 1 is a diagrammatic representation of a bell type furnace and control system therefor.

In the embodiment of the invention diagrammatically illustrated by way of example in Fig. 1, A represents the bell or dome of a furnace of well known type, comprising a hearth or furnace base B upon which the bell A is seated during the heating operation, and from which it is removed for the removal of the treated work and the introduction of work to be treated. The bell A as ordinarily constructed, comprises a metal shell and a refractory lining A'. Ordinarily the roof of the bell A carries a bail or eye $A^2$ for engagement by the hook of a crane (not shown), employed to lift the bell off and replace it on the base B. The work C in the furnace to be annealed, or otherwise heat treated, as conventionally illustrated, consists of a pile of metal plates stacked up on the base B. As shown, the work C is enclosed by an inner bell, hood, or work cover D, of metal, smaller than, and spaced away from the side and roof walls of the bell A. The hood D rests on the base B, and sealing means D' are provided to prevent gas leakage between the space enclosed by said hood and the space between the bell A and the hood.

The furnace conventionally illustrated in the drawing is of the well-known "radiant tube" type, in which the furnace is heated by radiation from a plurality of metal tubes E, each comprising a vertical portion of the inner side of, and adjacent, the vertical wall of the head A and having upper and lower end portions extending horizontally through said wall. Each of the tubes E serves as a combustion chamber, receiving a mixture of fuel gas and air for combustion at its lower end from a supply manifold F, at a rate regulated, as diagrammatically illustrated, by the adjustment of a control valve G in a supply pipe G' leading to the manifold F from air and gas mixing means (not shown). Each tube E discharges products of combustion at its upper end. As shown, sealing means $A^3$ are provided for sealing the joint between the lower edge of the head A and base B, and other sealing means $A^4$ are provided to prevent leakage through the openings in the vertical wall of the bell A through which the upper horizontal portions of the tubes E extend, those openings being larger in cross section than the tubes, to accommodate the relative expansion of the tubes E and bell A.

In Fig. 1, H', $H^2$, $H^3$ and $H^4$ are work thermocouples employed to measure the temperature of the work at different points. As shown, the thermocouples H' and $H^2$ are in contact with the work C and respond to its temperature at points adjacent the top of the work stack, and at opposite sides thereof; the thermocouple $H^3$ is in contact with the work and responsive to the temperature thereof at a point intermediate the top and bottom of the work stack and at one end of the latter; and the thermocouple $H^4$ is responsive to the temperature of the work at the underside of the stack. In addition to the previously mentioned work thermocouples, a furnace thermocouple $H^5$ is arranged to respond to the temperature of one of the tubes E at one side of the furnace, and another furnace thermocouple $H^6$ is arranged to respond to the temperature of one of the tubes E at the opposite side of the furnace.

In accordance with the present invention, the temperatures of the different work and furnace temperature thermocouples H'–$H^6$ are measured, one at a time and in predetermined order, by a temperature measuring and control instrument I, to which the different thermocouples are operatively connected in the predetermined order by an automatic selector switch mechanism J. The instrument I, shown, is a self-balancing potentiometer instrument, and may well be of the commercial recording potentiometer type know as the "Brown potentiometer", the general character of which is disclosed in the Harrison Patent No. 1,946,280 granted Feb. 6, 1934. As diagrammatically shown, the instrument I, comprises a slide wire resistor I' energized by a suitable source of current $I^2$, a control galvanometer $I^3$, a relay mechanism $I^4$ which may be a reversible motor, controlled by the galvanometer $I^3$, a helically grooved shaft $I^5$ rotated by the mechanism $I^4$, a pen carriage $I^6$ in threaded engagement with the shaft $I^5$, and adjusted longitudinally of said shaft by the rotation of the latter, and a contact $I^7$ adjusted along the slide wire resistor I' on, and in accordance with the extent and direction of, each balancing operation. As diagrammatically shown in Fig. 1, the contact $I^7$ is carried by and moves with the pen carriage $I^6$, but it may be actuated by the relay mechanism $I^4$, as is done in the said "Brown potentiometer", and in said Patent 1,946,280, wherein a relay mechanism adjusts the pen carriage and slide wire resistor of the instrument through separate driving connections. A conductor $I^8$ connects the adjustable contact $I^7$ to one terminal of the galvanometer $I^3$. The second terminal of the galvanometer constitutes one terminal $I^9$, of the instrument I, and one end of the slide wire resistor I' is connected to the second instrument terminal $I^{10}$.

The selector switch mechanism J operates to connect the terminals of the different thermocouples H'–$H^6$ to the instrument terminals $I^9$ and $I^{10}$ in the predetermined order, and at suitable intervals. As diagrammatically shown, the switch mechanism J comprises a shaft J' continuously rotated by an electric switch, or timing, motor $J^2$, energized by electric supply conductors 7 and 8. As diagrammatically illustrated, the switch shaft J' carries, and rotates in the counter-clockwise direction, two commutator or switch segment supporting members JA and JB, and two switch actuating cams JC and JD. Each of the members JA and JB supports a circular series of arc shaped segments of seven contacts, 1, 2, 3, 6'', 4, 5, and 6'. As shown, the contact segments 2 and 3 are each only half as long as each of the remaining segments, and the contacts 6' and 6'' of each commutator are diametrically opposed.

The thermocouple H' has one of its terminals connected by a conductor 1a to the segment 1 of the commutator JA, and has its other terminal connected by a conductor 1b to the segment 1 of the commutator JB. Similarly, each of the thermocouples $H^2$, $H^3$, $H^4$, and $H^5$, has one terminal connected to a corresponding contact of one, and has its other terminal connected to the corresponding segment of the other of the two commutators JA and JB, the thermocouples $H^2$, $H^3$, $H^4$ and $H^5$ being thus respectively connected by conductors 2a, 3a, 4a, and 5a to the segments 2, 3, 4, and 5, of the commutator JA, and being respectively connected by conductors 2b, 3b, 4b, and 5b to the commutator JB. The thermocouple $H^6$ has one terminal connected by a conductor 6a and branches 6a' and 6a'' to the segments 6' and 6'' of the commutator JA, and has its other terminal connected by a conductor 6b and branches 6b' and 6b'' to the contacts 6' and 6'', of the commutator JB. A stationary contact $J^3$, successively engaged by the contacts 1, 2, 3, etc., of the commutator JA, is connected by a conductor 9 to the terminal $I^9$ of the instrument I, and a stationary contact $J^4$ successively engaged by the contacts 1, 2, 3, etc., of the commutator JB is connected by a conductor 10 to the terminal $I^{10}$ of the instrument I.

If when the terminals of any one of the thermocouples H'–$H^6$ are connected to the terminals $I^9$ and $I^{10}$ of the instrument I, the voltage of that thermocouple is not equal to the opposing potential difference between the instrument terminal $I^{10}$ and contact $I^7$, the instrument galvanometer $I^3$ will deflect and start the balancing motor $I^4$ into operation to effect an equalizing adjustment of the contact $I^7$ along the resistor I'. With apparatus of the form diagrammatically shown in Fig. 1, time ordinarily sufficient for the attainment of accurate balance, may be obtained by giving a suitably slow speed to the shaft J'. In lieu of the means for actuating the switch mechanism illustrated in Fig. 1, use may be made of the means disclosed in the previously mentioned Patent 1,946,280, for successively connecting each of a plurality of thermocouples to the measuring means for a shorter or longer period, accordingly as the balance is, or is not quickly attained.

As the contact $I^7$ is adjusted along the slide wire resistor in the balancing operation, the pen carriage $I^6$ is correspondingly adjusted transversely of the travelling record chart (not shown), so that records may be made of the temperatures of the different thermocouples successively connected to the instrument I.

The adjustment of the pen carriage longitudinally of the shaft I⁵ also serves to actuate control instrumentalities which in conjunction with the cams JC and JD normally control the supply of fuel or fuel and air to the combustion tubes E through the pipe G'. Those control instrumentalities include control contacts M, MA, N and NA, adjusted by and in accordance with the movements of the pen carriage through operating means now to be described.

As diagrammatically shown, the operating means for adjusting the contacts M and MA include a mechanical linkage connection K' between a control table part K and each of the contacts M and MA, whereby those contacts are moved simultaneously to the right or the left, as the part K is moved down or up, respectively. As shown, the part K has an inclined edge engaged by a cam portion of the pen carriage I⁶, and when so engaged the part K is given up and down movements as the carriage I⁶ moves to the right and left, respectively. The control carriage including the part K, may be adjusted longitudinally of the pen carriage shaft I⁵ by manual rotation of a threaded adjusting shaft K². The effect of such adjustment is to change the work temperature range in which the pen carriage is in engagement with the part K.

The operating means through which the pen carriage movements give movements to the contacts NA and NB include parts L, L', and L², like the parts K, K', and K², except that the form of linkage L' is such that it imparts movements to contacts N and NA on a movement of carriage I⁶, which are the reverse of the movements imparted to contacts M and MA on corresponding movements of carriage I⁶. In consequence the contacts N and NA are moved to the right or left by movements of the pen carriage I⁶ to the right or left, respectively. The furnace temperatures are normally higher than the work temperatures, and notably so during the heating up operation. In consequence, the position of the pen carriage when it measures a furnace temperature, will be to the right of any position occupied by it when it measures any work temperature then existing. The control table including the part L, as shown in Fig. 1, is therefore displaced to the right of the control table including the part K. In the arrangement shown in Fig. 1, the pen carriage I⁶ and contacts N and NA, each moves to the right, and the contacts M and MA each moves to the left, on an increase in the temperature measured, and the movements are in the reverse direction on a decrease in the temperature measured.

The contact M engages a slide wire resistor $m$ and is adjusted along the length of said resistor by the pen carriage movements. The contact MA engages and moves along the length of an elongated stationary contact MB, as the pen carriage moves through a range of movement at the right of a position, corresponding to the work temperature determined by adjustment of the screw K², which must be attained to move the contact MA far enough to the left to engage the right hand end of the contact MB. As hereafter explained, the control apparatus is not adapted to effect control in response to work temperature, except when the temperature conditions are such that the contact MA is in engagement with the contact MB. The contact N engages a furnace resistor $n$ and is adjusted along the length of the latter by the pen carriage movements. As the pen carriage moves to the right into a certain position, corresponding to a furnace temperature determined by the adjustment of the screw L², the contact MA is moved into engagement with the left hand end of an elongated stationary contact MB, and for all temperatures measured which are higher than the one last mentioned, the contact MA remains in engagement with the contact MB.

The engagement and separation of the contacts MA and MB and NA and NB affect certain control circuits as hereinafter explained. One or the other of the resistors $m$ and $n$ is connected in a so-called "proportional" control system bridge circuit, accordingly as a relay mechanism O is respectively energized or deenergized. The relay mechanism O, as diagrammatically shown, comprises the four pivoted switch blades O', O², O³ and O⁴ of a four pole double throw switch mechanism, a solenoid winding O⁵, and an armature O⁶ axially movable in the winding O⁵. The armature O⁶ is link connected to said switch blades, and when deenergized is moved by a bias spring O⁷, into the position in which the switch blades O', O² and O³, and O⁴ are moved into engagement with front switch contacts 11, 13, 15 and 17, respectively. The energization of the relay winding O⁵, moves the armature O⁶ to the left, and thereby moves the switch blades O', O², O³ and O⁴ out of engagement with said front contacts, and into respective engagement with back switch contacts 12, 14, 16, and 18.

The high temperature end of the furnace resistor $n$, i. e., the end toward which the contact N moves as the measured temperature increases, is connected to the front contact 11, and the high temperature end of the work resistor $m$ is connected to the corresponding back terminal 12. The low temperature ends of the resistors $n$ and $m$, are respectively connected to front contact 15 and back contact 16. The adjustable contacts N and M are respectively connected to the contact 13 and back contact 14. The switch blade O' is connected by a conductor 19 to the supply conductor 7, and the switch blade O³ is connected by a conductor 20 to the supply conductor 8. The switch blade O² is connected to the midpoint $p'$ of a solenoid winding $p$, and to a contact Q adjustable along the length of a resistor $q$. The conductors 19 and 20 are the energizing conductors of the above mentioned bridge circuit and the solenoid winding $p$ and control resistor $q$ form permanent parts of said circuit, being connected between the conductors 19 and 20, in parallel with one another and with whichever of the resistors $m$ and $n$ is connected into the bridge circuit.

An increase or decrease in the current flow through the half of the winding $p$ at one side of the midpoint $p'$, relative to the current flow through the other half of the winding $p$, results in a movement of a solenoid core or armature P, which is axially movable in the winding $p$, to the right or to the left, respectively. A movement of armature P to the right or left, moves a pivoted switch blade P' mechanically connected to the armature P, into engagement with a switch contact R' or R², respectively. The contact R' is connected to one terminal of a winding R³, and the contact R² is connected to one terminal of a winding R⁴. The windings R³ and R⁴ are the energizing windings of a reversible control motor R. The latter, when operated, adjusts the furnace supply valve G through a connection R⁵, and through a connection R⁶ adjusts the contact Q along the resistor $q$.

As those skilled in the art will recognize, except in respect to the provisions for connecting the resistors $m$ and $n$ alternately into the bridge circuit, the latter and the motor R and its adjusting connections with the bridge contact Q, and with a control device, such as the valve G, constitute a so-called proportioning control system, which is well known and in extensive use. When the winding $R^4$ is energized as a result of an increase in the temperature measured, the motor R operates in the direction to adjust contact Q to the left and to give a closing adjustment to the valve G. The latter is given an opening adjustment and contact Q is moved to the right when winding $R^3$ is energized.

The switch blade P' is connected by a conductor 21 to the supply conductor 7, which is thus connected to the winding $R^3$ or $R^4$ when the switch blade P' engages the contact R' or $R^2$, respectively. To energize either of the windings $R^3$ and $R^4$, it is also necessary, however, to connect the common second terminal of the two windings to the supply conductor 8. That connection may be effected, under certain conditions, through the conductor 22 and a control selector switch S. I call the switch S a control selector switch because its position determines or selects which of the two proportioning control resistors $m$ or $n$ will be effective when the measuring apparatus is responsive selectively to the various thermocouples. The switch S, as shown, is a three position mercury switch. When the switch S is tilted into one end position shown in Fig. 1, the mercury within the switch container connects two switch contacts at the left hand end of the switch, one connected to one branch of the conductor 22, and the other connected to a conductor 23, which is also connected to the contact 17 of the relay mechanism, O. When switch S is tilted into its second end position, the mercury in the switch container forms a bridging connection between two switch contacts at the right hand end of the switch container. One of those contacts is connected to a branch of conductor 22, and the other contact is connected by a conductor 24, to the switch contact 18 of relay mechanism O.

The switch S is shown as carried by one arm of a bell crank lever S' pivoted at $S^2$. The second arm of the lever S' carries a roller $S^3$, riding on the edge of the notched cam disc JD. The major portion of the edge of the disc JD extends circularly about the disc axis, but said edge is formed with two diametrically opposed notches JD' and JD'', and with an outwardly extending projection $JD^3$.

In the particular form and arrangement of the apparatus shown, the roller $S^3$ is received in the notch JD', when the positions of the cam JD and commutators JB are such that the stationary contact $J^4$ is in engagement with the half of the segment 6 adjacent the segment 1. The roll $S^3$ is received in the notch JD'' when the contact $J^4$ is in engagement with the portion of the contact 6'' adjacent the contact or segment 4. With the roller $S^3$ received in either notch JD' or JD'', the switch S is in the end position, shown in the drawings, in which it connects conductors 22 and 23, and thus the control of the furnace heat supply to be dependent on the temperature of furnace temperature thermocouple $H^6$, as is hereinafter explained, provided the relay O is in the condition to connect the furnace resistor $n$ in the control circuit.

With the roller $S^3$ riding on the main circular edge portion of the disc JD, the switch S is in its mid-position, in which it connects neither of the conductors 23 and 24 to the conductor 22, and the normal furnace control is then not subject to furnace temperature, nor to work temperature control so that the control motor R cannot be energized. When the cam roller $S^3$ rests on the end of the projection $JD^3$, the switch S is tilted clockwise from the position shown in Fig. 1, far enough to connect the conductor 24 to the conductor 22. This occurs, with the arrangement shown, when, and only when the relative position of the parts is such that the work thermocouple H' is connected to the instrument I, so that the furnace heat supply may then be controlled by the temperature of that work thermocouple, provided the condition of the relay O is such that the work resistor $m$ is then connected into the bridge circuit of the proportioning system.

The work resistor $m$ is connected into the bridge circuit, when the winding $O^5$ of the relay O is energized and the switch blades O', $O^2$ and $O^3$ engage the back contacts 12, 14, and 16, respectively, and energization of relay O requires that the contact MA be in engagement with the contact MB, and that a switch T be adjusted by the cam JC into its closed position. The relay O is energized through a circuit including a conductor 25 connecting one end of the winding $O^6$ to the conductor 19, and thereby to the supply conductor 7, and a connection between the second terminal of the winding $O^6$ and the supply conductor 8 comprising a conductor 26, a contact or arm V' of an electromagnetic relay V, and a conductor 27. The contact V' connects the conductors 26 and 27 and thereby effects energization of the coil $O^6$ only when the winding $V^2$ of the relay V is energized.

In the normal contemplated operation, the relay V will be deenergized during an initial heating up operation in which the temperature of each of the various work thermocouples $H'-H^4$ is below the temperature required to move the contact MA into engagement with the contact MB. When the measured temperature of any one of the work thermocouples $H'-H^4$ is high enough to maintain the contact MA in engagement with the contact MB, an energizing circuit for the winding $V^2$ is closed. That energizing circuit includes the conductor 28 connecting one terminal of the winding $V^2$ to the supply conductor 7, a conductor 29 connecting the other terminal of the winding $V^2$ to one contact of the switch T, a conductor 30 connecting the second contact of the switch T to the contact MB, and a conductor 31 through which the contact MA is connected to the supply conductor 8. As shown, the conductor 31 is connected to the conductor 8 at all times through a resistance 32 and conductor 34.

The switch T, which I may call a switch-over control switch because its adjustment is required to shift from furnace temperature control to a work temperature control, is open except during periods in which one or another of the work temperature thermocouples $H'-H^4$ is connected to the instrument I. As shown, the switch T is a mercury switch carried by a lever T' pivoted at $T^2$, and adjusted between open and closed positions by means of a bell crank lever $T^3$, pivoted at $T^4$ and having one arm connected by a pin and slot connection to the lever T', and carrying a cam engaging roll $T^5$ at the free end of its other arm. The roll $T^5$ rests on the peripheral edge of the cam disc JC. The major portion of that edge is formed by arcs of a circle of a radius so large that when engaged by the roll $T^5$, the switch T is maintained in its open position. When that roll enters either of two notches $JC'$ and $JC^2$ formed in the edge of the disc JC, the switch T is adjusted into its closed position, in which it connects the conductors 29 and 30. The notch $JC'$ is of such length and so disposed as to maintain the switch T in its closed position during the final portion of the period during which the thermocouple $H'$ is connected to the instrument I, and throughout the entire periods during which the thermocouples $H^2$ and $H^3$ are so connected. The notch $JC^2$ is shaped and disposed so as to maintain the switch T in its closed position during the final portion of the period in which the thermocouple $H^4$ is connected to the instrument I.

The energization of the relay mechanism $V^2$ closes a holding in circuit, maintaining the energization of the relay when the previously described energizing circuit is opened either by the adjustment of the switch T into its open position, or by the movement of the contact MA out of engagement with the contact MB. The said holding in circuit comprises the conductor 28, the relay winding $V^2$, the relay switch contact or arm $V^3$, which, when the relay is energized, engages the stationary relay switch contact to which the upper terminal of the winding $V^2$ is connected, the conductor 33 and resistor 32 and conductor 34.

Control is effected in response to the temperature of the work only at the point at which the thermocouple $H'$ is located, as a result of the fact that the cam JD adjusts the switch S in position to connect the conductors 22 and 24, and energizes the motor R during a period in which the relay O is energized, only when the roller $S^3$ engages the edge of the cam shoulder $JD^3$. However, the attainment by any one of the work thermocouples $H'$, $H^2$, $H^3$ and $H^4$ of a temperature high enough so that the contact MA engages the contact MB during any period in which the switch T is closed will result in an energization of the relay V, if previously deenergized. The effect of such energization is to terminate control in response to furnace temperature, and to initiate control in response to the temperature of the work thermocouple $H'$, and cutting the work resistor $m$ into that circuit.

If after control in response to work temperature is thus initiated, the temperature of the thermocouple $H'$ is too low to maintain the contact MA in engagement with the contact MB, the control will nevertheless be responsive to the temperature of the thermocouple $H'$, since the energization of the relay V is maintained by the previously mentioned holding in circuit. With the assumed low temperature of the thermocouple $H'$, the control in response to that temperature results in an opening adjustment of the control valve G, unless that valve is already wide open as a result of its previous adjustment in response to the furnace temperature control. As those skilled in the art will understand, the motor R is normally provided with limit switches $R^7$ and $R^8$, by which further operation of the motor R in the valve opening or valve closing position, is prevented if the movement is sufficient to adjust the valve into its wide open or fully closed position.

The apparatus is arranged for the actuation of the switches S and T in such timed relation with the connection of the different thermocouples to the instrument I that control is effected during the final portion only of each period during which each of the two controlling thermocouples $H'$ and $H^6$ is connected to the instrument I, so as to provide time for a balancing operation of the instrument I, during the initial portion of the period, whereby in the final portion of the period during which control is effected, the pen carriage position may correspond with approximate accuracy to the temperature of the thermocouple then connected to the instrument. Similarly, the switch T is closed during the final portion only of the period during which the thermocouple $H^4$ is connected to the instrument H, so that when the roller $T^5$ enters the notch $JC^2$, the position of the contact MA longitudinally of the contact MB, will have been brought into approximately accurate correspondence, with the temperature of the thermocouple $H^4$. The contacts or segments 2 and 3 of the commutator JA and JB may well be only half as long as the other contacts, because the temperatures of the thermocouples $H^2$ and $H^3$ can be expected to differ from one another and from the temperature of the thermocouple $H'$ only by such a small amount as to require a relatively small and quickly effected rebalancing operation of the instrument I, when either of the thermocouples $H^2$ and $H^3$ is connected to the instrument I.

If, as may well be the case, after energization of relays V and O, and the initiation of control in response to work temperature, the furnace temperature thermocouple $H^6$ increases to a certain value which exceeds what may be regarded as a normal maximum temperature, and which results in movement of the contact NA into engagement with the contact NB, control in response to work temperature is interrupted and control in response to furnace temperature is resumed. This transfer of control results from the closure of a circuit deenergizing the relay winding $V^2$. That deenergizing circuit includes supply conductor 1, conductor 28, relay winding 38, which when energized opposes the action of winding $V^2$ to thereby deenergize the relay, conductor 37 to contact NA, contact NB and conductor 36 to one terminal of a switch U, a conductor 35, conductor 29, relay contact $V^3$, conductor 33, resistor 32 and conductor 34. The switch U is a mercury switch, operatively connected to the switch S by a connection $S^4$, so that the switch U is closed during the furnace control periods in which the roller $S^3$ is received in one or the other cam notches $JD'$ and $JD''$, but is open at all other times.

When control in response to furnace temperature is thus restored, the position of the contact N is such that the motor R is energized to give a closing adjustment to the valve G during the period in which the switch U, which may be called a recycling selector switch, is closed. As soon as that switch opens, the relay V is immediately reenergized, since under the conditions then prevailing, all of the work thermocouples are hot enough to insure continuous engagement of contacts MA and MB. So long as the temperature conditions are such that the contact NA is in engagement with the contact NB when the recycling selector switch U is closed, and the contact MA is in engagement with the contact MB when the recycling selector switch is open, control in response to the temperature of the work thermocouple $H'$ will alternate with the control in response to the temperature of the thermocouple $H^6$. Under such conditions each control action in response to the temperature of the thermocouple $H^6$ will be a closing adjustment of the valve G. In consequence, after a number of shifts as the switch U alternately opens and closes, between control in response to work temperature and control in response to furnace temperature, a stable condition is finally reached, with the thermocouple $H^6$ at a temperature lower than that required for engagement of the contacts NA and NB. During the ensuing final portion of the annealing or analogous operation, the control is continuously subject to the temperature of the work thermocouple H'.

At this point it is noted that while useful information is provided by measurements at regular intervals of the temperature of the work at a plurality of points, and of the temperature of the furnace at another plurality of points, it is not practically desirable to effect control in response to the temperature at a plurality of work points, or in response to the temperature at a plurality of furnace points, since control in response to the temperature, first one and then another work point, or at first one and then another furnace point, may result in a cyclic relative variation of the temperatures at the different control points.

If as a result of some abnormal condition, the furnace temperature increases to some value which may be 25° or so above that at which the contacts NA and NB engage, and which is high to make an emergency or safety control action desirable, that action results in the arrangement shown in Fig. 1 from the closure of a switch W. The latter is shown as a mercury switch, pivoted at W' and normally biased to its open position. The switch W is adjusted to its closed position by a connection WI between the switch and an element of the instrument I shown as a pivoted arm $I^{11}$ biased gravitationally to occupy a position in which it holds the switch W open, but engaged by the carriage $I^6$ and tilted to thereby move the switch W into its closed position, by movement of the carriage $I^6$ into a position to the right of its normal position range. The exact temperature at which the pen carriage $I^6$ will engage the lever I'' and close the switch W may be adjusted by manual rotation of a shaft $I^{12}$ in threaded engagement with the support to which the arm I'' is pivoted.

The closure of the switch W closes a cut-off valve WA in the fuel and air supply pipe G'. The valve WA may be of a well-known type biased for movement into its closed condition but including means for locking it in its open condition, and electromagnetic means adapted, when energized to render the locking means inoperative, and thereby cut off the fuel and air supply to the furnace. In the arrangement shown, the closure of the switch W energizes the electromagnetic unlocking means of the valve WA, by closing a circuit including the supply conductor 7, a conductor 39, switch W, supply conductor 40, connecting the switch to one terminal of the electromagnetic unlocking means of the valve WA, and a conductor 41 connecting the other terminal of said means to the supply conductor 8. Alternatively, the switch W may be adapted to shunt the switch blades O', $O^2$ of relay O, or contacts P', $R^2$ of switch 21, to thereby energize valve G to rotate to the closed position on a rise above a predetermined value, of the temperature to which the thermocouple $H^5$ or $H^6$ is responsive.

The general character of the operation of the apparatus shown in Fig. 1, will be apparent from what has already been said. At the beginning of each furnace operation or heating cycle, if the holding in circuit for the relay V is closed, as will ordinarily be the case, the relay V, and thereby the relay O, may be deenergized to permit an initial control in response to the temperature of the thermocouple $H^6$, by the manually effected closure of a normally open pushbutton switch X. The latter, when closed, completes a connection between the conductors 35 and 37, comprising conductors 42 and 43, and the switch X, which is a shunt to the previously described connection between the conductors 35 and 37, effected by the closure of the switch U at a time when the contact NA engages the contact NB. Following the described deenergization of the relays V and O, the control of the furnace supply valve G is subject for a time to the temperature of furnace thermocouple $H^6$, with the result that the bridge circuit, then including the resistor $n$ in parallel with the winding $p$ and resistor $q$, is unbalanced by the adjustment of the contact N to the right as the furnace temperature increases. The resultant adjustment of armature P to the left, moves the contact P' into engagement with the contact $R^2$, thereby energizing the motor R, through circuit connections previously described, for operation in the direction to give a closing adjustment to the valve G.

After a time, one or another of the work temperature thermocouples H', $H^2$, $H^3$, and $H^4$, attains a temperature high enough to maintain the switch over contact MA in engagement with the contact MB during a period in which the switchover selector switch T is in its closed position. Thereupon the relays V and O are energized, and thereafter the control is responsive to the temperature of the work thermocouple H', unless and until the temperature of the furnace thermocouple $H^6$ becomes high enough to effect engagement of the contacts NA and NB. That engagement results in a control action in response to the temperature of the thermocouple $H^6$, and thereafter control actions are normally effected in alternate response to the temperatures of the work thermocouple H' and furnace thermocouple $H^6$, until the heating process stabilizes with a furnace temperature below that at which the contact NA engages the contact NB, so that the control is continuously responsive to the temperature of the work thermocouple H', during the final portion of the heating operation.

As has been explained, the switch W serves a safety purpose, by cutting off the supply of heat to the furnace on the attainment of a predetermined and unsafely high furnace temperature. It is to be observed that the temperature of the furnace thermocouple $H^5$ cannot effect a control action directly because of the timing of the switch S, or indirectly through the recycling contacts NA and NB, because of the timing of the recycling selector switch U.

The temperatures at which the contacts MA and NA engage the contacts MB and NB, respectively, may obviously be varied by longitudinal adjustment of the contacts MA and MB. To facilitate such adjustments, special adjusting provisions may be included in the instrument I, one form of such adjusting provisions being illustrated in Fig. 2. As an example, the control table K may be adjusted to maintain a work temperature of 1350° F., and the contact MB adjusted to effect switch over to control from work temperature at that temperature; the control table L may be adjusted to maintain a furnace temperature of 1700° F. and the recycling contact NB may be adjusted to effect return to control from furnace temperature at 1725° F. (25° above normal furnace temperature); and the safety switch W may be adjusted to effect shut down at 1750° F.

An alternative relay to that shown in Fig. 1 is shown in Fig. 1A in which contact members V' and V³ are connected together and to line 8 and winding 38 is replaced by a resistor 38A. In the use of this relay, resistor 32 is omitted and conductor 31 is connected directly to line 8. On closure of switch over contact MA while switch T is closed, an energizing circuit for winding V² will be closed from line 8, conductor 31, contacts MA and MB, conductor 30, switch T, conductor 29 to winding V² and from the latter to resistor 38A, conductor 50 and line 7. A holding circuit for the relay will then be completed from line 8, conductor 27, contact V³, winding V², resistor 38A and conductor 50 to line 8. Winding O⁵ of relay O will also be energized as in the circuit of Fig. 1. The conductor 37 is connected to the common end points of winding V² and resistor 38A so that upon closure of push button X or contacts NA and NB (when switch U is closed) will result in a short circuit about winding V² over conductor 29, through contacts NA and NB or switch X to conductor 37 thereby deenergizing relay V.

The recording of the measurements effected during the initial portions of the periods in which the thermocouples H', H⁴, H⁵ and H⁶ are respectively connected to the instrument I, as well as those measured during the final portions of the periods last mentioned, and during the periods in which the thermocouples H² and H³ are connected to the instrument I, may easily be effected with a recording and control potentiometer of standard form, particularly when that instrument is so formed that the different record impressions are distinguished by different colors. Such an instrument is disclosed in Patent 1,946,280 to Thomas R. Harrison.

The control system shown in Fig. 1, was devised, and is adapted for a heat treating operation in which the work temperature is gradually increased to a certain temperature, and is then maintained at that temperature until the operation is completed. In some heat treating operations, however, it is desirable, to maintain the work at different predetermined temperatures during successive fractional portions of the heat treating period. For example, in some annealing operations, it is desirable to gradually heat the work up to a maximum annealing temperature, and then to maintain the work at that temperature for a considerable period of time, and thereafter to gradually reduce the work temperature in a predetermined manner during a definite final portion of the operation period. The operation just described can be effected with apparatus including the apparatus shown in Fig. 1, combined with mechanism including a timing device for varying the work temperature at which the contact MA is in engagement with the extreme right hand end of the contact MB, and for similarly varying the position of the contact M along the resistor m for a given work temperature.

Figure 2:
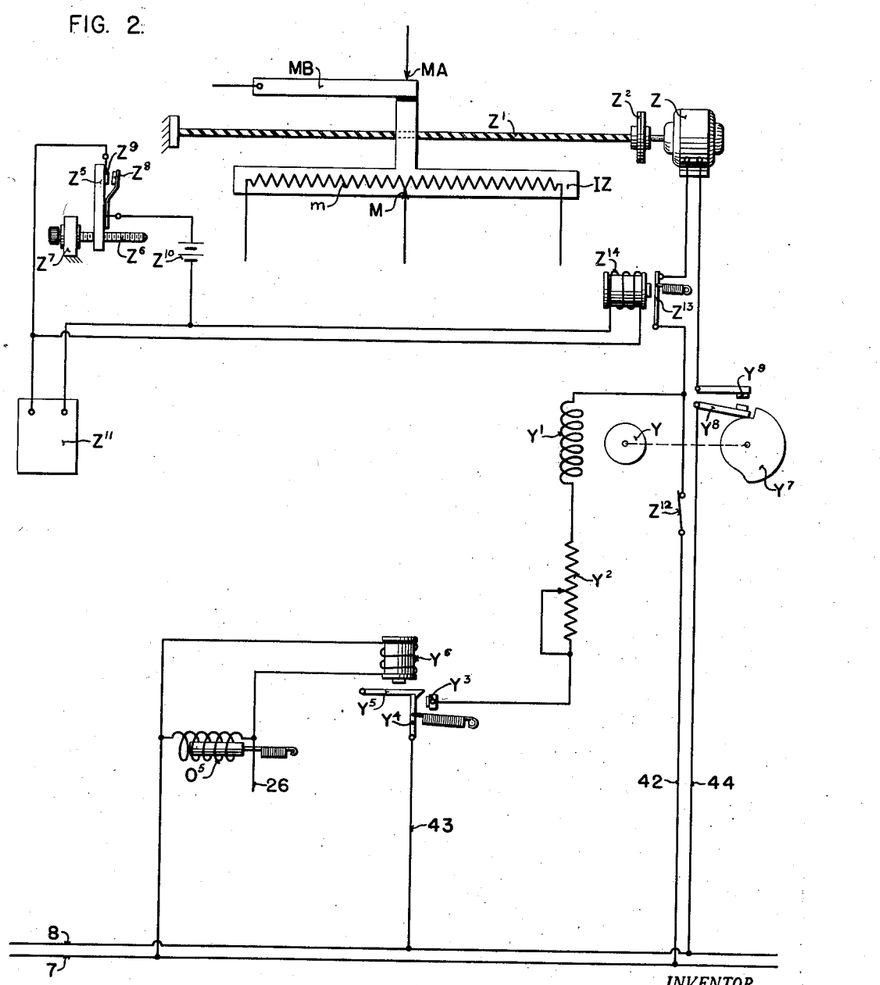
Fig. 2 is a diagrammatic representation of control apparatus which may be added to apparatus of the character shown in Fig. 1, for maintaining predetermined work temperatures varying in a predetermined manner during definite time periods, following the attainment of a predetermined work temperature.

One form of apparatus which may thus be combined with the apparatus shown in Fig. 1 and one mode of effecting the combination, are illustrated in Fig. 2 wherein Y represents a timing motor. The energizing winding Y' for the latter, has one terminal connected to the supply conductor 7, through a conductor 42, and has its other terminal connected through an adjustable resistance Y², to a stationary switch contact Y³. A switch arm Y⁴, connected by a conductor 43 to the supply conductor 8, is spring biased for movement into engagement with the contact Y³, to thereby start the motor Y into operation. During the initial portion of each heating operation, however, the switch arm Y⁴ is locked out of engagement with the contact Y³ by a pivoted latch bar Y⁵. As shown, the latter is gravitationally biased to its locking position, but is adapted to be moved out of that position by the energization of a magnetic coil Y⁶, shown as connected in shunt to the relay winding O⁶.

In consequence, when winding O⁶ is energized to terminate the initial control in response to furnace temperature and to initiate control in response to work temperature, as previously described, the energizing circuit for the motor Y is closed, and the latter starts into operation. Subsequent deenerigizations and reenergizations of the coil O⁶, while deenergizing and reenergizing the coil Y⁶, do not interfere with the continuous energization of the motor winding Y'. As shown, the locked condition of the switch arm Y⁴ can only be restored by manuel adjustment of the parts Y⁴ and Y⁵.

The motor Y, in the form of apparatus diagrammatically shown in Fig. 2, energizes an instrument motor Z at the end of a predetermined time interval, following the initiation of control in response to work temperature. To that end, the motor Y, when in operation, slowly rotates a cam Y⁷. As the latter may well be required to make but a single revolution in two or three or more hours, the driving connection between the motor Y and the cam Y⁷ must, in practice, include a suitable speed reducing gear, which need not be illustrated. After a partial revolution of the cam Y⁷, the latter moves a pivoted switch arm Y⁸ into engagement with a switch contact Y⁹. The switch arm Y⁸ is connected to the supply conductor 8 by a conductor 44, and the contact Y⁹ is connected to one terminal of the motor Z, while the other terminal of that motor is connected to the supply conductor 7 by the conductor 42. The motor Z rotates a threaded shaft Z' through a friction clutch Z², and ordinarily, also, through a speed reducing gear, not shown, at a suitably slow rate. The shaft Z' is in threaded engagement with a control table part IZ of the instrument I, so that when the motor Z is in operation the part IZ is bodily adjusted to the left. The table IZ supports the contact MB, and also supports the work resistor m. In consequence, the work temperature which the apparatus tends to maintain, is gradually reduced by the bodily movements to the left of the contact MB and resistor m, effected by the rotation of the motor Z.

After a suitably prolonged period, the operation of the motor Z may be arrested by manual or automatic action and in Fig. 2, I have illustrated means by which after a predetermined extent of operation of the motor C, a signal device is actuated, and the operation of the motor is positively terminated. Said means comprises an abutment member Z⁵, which may be manually adjusted in the direction of the adjustment movement of the table IZ, by rotation of a threaded spindle Z⁶, swivelled in a stationary support Z⁷, and in threaded engagement with the abutment member Z⁵. The latter extends into the path of movement of the part IZ and may be employed to simply arrest the adjustment movement of the part IZ when the latter moves into engagement with said abutment. The motor Z may then continue in operation without injury to the apparatus, owing to the provision of the friction clutch $Z^2$.

As shown, the member IZ, as it moves into engagement with the abutment $Z^5$, forces a spring contact $Z^8$ into engagement with a second contact $Z^9$, both contacts being carried by the abutment. The engagement of the contact $Z^8$ and $Z^9$ closes a signal circuit which includes a source of current $Z^{10}$, and an electric bell, lamp, or other electric signalling device $Z^{11}$. On the nergization of the signal device $Z^{11}$, the motor Z may be deenergized manually by opening a normally closed switch $Z^{12}$, in the motor energizing circuit. The movement of the contact $Z^8$ into engagement with the contact $Z^9$ may also serve to automatically open the energizing circuit of the motor Z, by moving a switch member $Z^{13}$ out of a normally closed position into an open position. The opening adjustment of the switch member $Z^{13}$ is effected, as diagrammatically shown in Fig. 2, by the energization of an electromagnetic winding $Z^{14}$, which is connected to the energizing circuit for the signal device $Z^{11}$, in parallel with the latter.

Having now described my invention, what I claim as new and desire to secure by Letters Patent, is:

1. In controlling the supply of heat to a heater by and in accordance with measurements of the temperature of the heater and of different portions of work heated therein, the method which consists in regulating the heat supply to the heater in response to the heater temperature while the temperatures of each of said work portions is below a predetermined value, and in regulating the heat supply in response to the temperature of a predetermined one of said work portions after the temperature of any one of said portions has attained said predetermined value.

2. In controlling the supply of heat to a heater by and in accordance with measurements of the temperature of the heater and of different portions of work heated therein, the method which consists in regulating the heat supply to the heater in response to the heater temperature while the temperatures of each of said work portions is below a predetermined value, and in regulating the heat supply in response to the temperature of a predetermined one of said work portions after the temperature of any one of said portions has attained said predetermined value, and so long as the heater temperature does not exceed a second predetermined value and in diminishing the heat supply when said predetermined heater temperature is attained.

3. Apparatus for controlling temperature conditions in a heater, comprising in combination, means adapted to successively measure a heater temperature and temperatures of different portions of work heated in said heater, a heat supply regulator, control mechanism adjustable between one condition in which it is adapted to adjust said regulator in accordance with said heater temperature and a second condition in which it is adapted to adjust said regulator in accordance with the temperature of a predetermined one of said portions, and means actuated by said measuring means to adjust said mechanism from said one condition into said second condition on an increase of the temperature of any one of said portions to a predetermined temperature.

4. Apparatus for controlling temperature conditions in a heater, comprising in combination, means adapted to successively measure a heater temperature and temperatures of different portions of work heated in said heater, a heat supply regulator, control mechanism adjustable between one condition in which it is adapted to adjust said regulator in accordance with said heater temperature and a second condition in which it is adapted to adjust said regulator in accordance with the temperature of a predetermined one of said portions, and means actuated by said measuring means to adjust said mechanism from said one condition into said second condition on an increase of the temperature at any one of said portions to a predetermined temperature, and to adjust said mechanism from said second condition back into said one condition on the attainment of a predetermined heater temperature higher than that normally required for the attainment of said predetermined work portion temperature.

5. Apparatus for controlling temperature conditions in a heater, comprising in combination, means adapted to successively measure a heater temperature and temperatures of different portions of work heated in said heater, a heat supply regulator, control mechanism adjustable between one condition in which it is adapted to adjust said regulator in accordance with said heater temperature and a second condition in which it is adapted to adjust said regulator in accordance with the temperature of a predetermined one of said portions, and means actuated by said measuring means to adjust said mechanism from said one condition into said second condition on an increase of the temperature of any one of said portions to a predetermined temperature, and to adjust said mechanism from said second condition back into said one condition on the attainment of a predetermined heater temperature higher than that normally required for the attainment of said predetermined work portion temperature, and means independent of said regulator actuated by said measuring means to reduce the heat supply to the heater on the attainment of a heater temperature higher than any of the previously mentioned temperatures.

6. Measuring and control apparatus comprising in combination, measuring means, selector means cooperating with said measuring means to measure two related quantities alternately, two circuit elements each comprising a slide wire resistor and an associated contact adjusted relative to said resistor by said measuring means in each measuring operation to a position corresponding to the value of the quantity then measured, means including a switch mechanism for establishing a control bridge circuit including one or the other of the two circuit elements, dependent on the adjustment of said switch mechanism, and means for producing control effects dependent on the position of the contact of the circuit element included in the bridge circuit.

7. Measuring and control apparatus comprising in combination, measuring means, selector means cooperating with said measuring means to measure two related values alternately, two circuit elements each comprising a slide wire resistor and an associated contact adjusted relative to said resistor by said measuring means in each measuring operation to a position corresponding to the value of the quantity then measured, means including a switch mechanism and a third circuit element comprising a slide wire resistor and associated contact for establishing a bridge circuit including said third circuit element and one or the other of the two circuit elements dependent on the adjustment of said switch mechanism, and means for producing control effects dependent on the positions of the contacts of the two circuit elements included in the bridge circuit.

8. Measuring and control apparatus comprising in combination, measuring means, selector means cooperating with said measuring means to measure two related quantities alternately, two circuit elements each comprising a slide wire resistor and an associated contact adjusted relative to said resistor by said measuring means in each measuring operation to a position corresponding to the value of the quantity then measured, means including a switch mechanism for establishing a control bridge circuit including one or the other of the two circuit elements, dependent on the adjustment of said switch mechanism, and means associated with said selector means and operative to produce control effects dependent on the position of the contact of the circuit element included in the bridge circuit at times when the position of said contact corresponds to the measure of one, but not of the other of said quantities.

9. Measuring and control apparatus comprising in combination, measuring means, selector means cooperating with said measuring means to measure two related quantities alternately, two circuit elements each comprising a slide wire resistor and an associated contact adjusted relative to said resistor by said measuring means in each measuring operation to a position corresponding to the magnitude of the measurement then made, means including a switch mechanism for establishing a control bridge circuit including one or the other of said circuit elements, dependent on the adjustment of said switch mechanism, means for adjusting said mechanism in predetermined accordance with changes in said measurement magnitudes, and means for producing control effects dependent on the position of the contact of the circuit element included in the bridge circuit.

10. Measuring and control apparatus comprising in combination, measuring means, selector means cooperating with said measuring means to measure two related quantities alternately, two circuit elements each comprising a slide wire resistor and an associated contact adjusted relative to said resistor by said measuring means in each measuring operation to a position corresponding to the magnitude of the measurement then made, means including a switch mechanism for establishing a control bridge circuit including one or the other of said circuit elements, dependent on the adjustment of said switch mechanism, means for adjusting said mechanism in predetermined accordance with changes in said measurement magnitudes, and means for producing control effects dependent on the position of the contact of the circuit element included in the bridge circuit at times when the last mentioned position corresponds to the measurement of one, but not of the other of said quantities.

11. Measuring and control apparatus comprising in combination, measuring means, selector means cooperating with said measuring means to measure more than two related quantities in repeated succession, two circuit elements each comprising a slide wire resistor and an associated contact adjusted relative to said resistor by said measuring means in each measuring operation to a position corresponding to the value of the quantity then measured, means including a switch mechanism for establishing a control circuit including one or the other of the two circuit elements, dependent on the adjustment of said switch mechanism, and means for producing control effects dependent on the position of the contact of one circuit element at times at which a particular one of said quantities is being measured, and said one element is included in the bridge circuit and dependent on the position of the contact of the other element at times at which another particular one of said quantities is being measured and said other element is included in the bridge circuit.

12. In controlling the supply of heat to a heater by and in accordance with measurements of the temperatures of the heater and of different portions of work heated therein, the method which consists in regulating the heat supply to the heater in response to the heater temperature while the temperatures of each of said work portions is below a predetermined value, and in regulating the heat supply in response to the temperature of a predetermined one of said work portions after the temperature of any one of said portions has attained said predetermined value, so as to maintain the temperature of said predetermined one of said work portions approximately constant for a predetermined time, and thereafter varying the last mentioned temperature in a predetermined manner.

13. Apparatus for controlling temperature conditions in a heater, comprising in combination, means adapted to successively measure a heater temperature and temperatures of different portions of work heated in said heater, a heat supply regulator, control mechanism adjustable between one condition in which it is adapted to adjust said regulator in accordance with said heater temperature and a second condition in which it is adapted to adjust said regulator in accordance with the temperature of a predetermined one of said portions, a timing means, means actuated by said measuring means to adjust said mechanism from said one condition into said second condition on an increase of the temperature of any one of said portions to a predetermined temperature, and to start said timing means into operation on the attainment of a predetermined work temperature, and means actuated by said timing means to vary the work temperature which the apparatus tends to maintain.

14. Apparatus for controlling temperature conditions in a heater, comprising in combination, means adapted to successively measure a heater temperature and temperatures of different portions of work heated in said heater, a heat supply regulator, control mechanism adjustable between one condition in which it is adapted to adjust said regulator in accordance with said heater temperature and a second condition in which it is adapted to adjust said regulator in accordance with the temperature of a predetermined one of said portions, a timing mechanism, means actuated by said measuring means to adjust said control mechanism from said one condition into said second condition on an increase of the temperature of any one of said portions to a predetermined temperature, and to start said timing means into operation on an increase in said work temperature, and means including a relay motor started into operation by said timing means on the attainment of a predetermined work temperature condition to effect an adjustment of said regulator after a predetermined time interval.

15. Apparatus for controlling temperature conditions in a heater, comprising in combination, a plurality of devices respectively responsive to the temperatures at a plurality of work points, a plurality of devices respectively responsive to temperatures at a plurality of heater points, measuring means, selector means adapted to connect said devices to said measuring means, one after another in a predetermined manner, a control system, means actuated by said measuring means on the attainment of predetermined work and heater temperature conditions, to adjust said system between one condition in which it is adapted to effect control in response to work point temperature and a second condition in which it is adapted to effect control in response to heater point temperature, and means associated with said selector means to render said control system when in said one condition operative only in response to the measurement of the temperature at a particular one of said work points, and to render said system operative when in said second condition, only in response to the measurement of the temperature at a particular one of said furnace temperature points.

16. Apparatus for controlling temperature conditions in a heater, comprising in combination, a plurality of devices, respectively responsive to the respective temperatures at a plurality of work points, a device responsive to temperature at a heater point, measuring means, means adapted to connect said devices to said measuring means, one after another in a predetermined manner, a control system, means actuated by said measuring means to adjust said system between one condition in which it is adapted to effect control in response to work point temperature and a second condition in which it is adapted to effect control in response to heater point temperature, accordingly as the temperature at said heater point is below or above a predetermined temperature and means associated with said selector means to render said control system operative or inoperative when in said one condition, accordingly as the temperature at a particular one of said work points, is, or is not being measured.

17. Apparatus for controlling temperature conditions in a heater, comprising in combination, a plurality of devices, respectively responsive to the respective temperatures at a plurality of work points, a device responsive to the temperature at a heater point, measuring means, selector means adapted to connect said devices to said measuring means, one after another in a predetermined manner, a control system, means actuated by said measuring means on the attainment of predetermined work and heater temperature conditions, to adjust said system between one condition in which it is adapted to effect control in response to work point temperature and a second condition in which it is adapted to effect control in response to heater point temperature, and means associated with said selector means to render said control system when in said one condition, operative, only in response to the measurement of the temperature at a particular one of said work points.

18. Apparatus for controlling temperature conditions in a heater, comprising in combination, means adapted to measure a heater temperature and a temperature of work heated in said heater, a heat supply regulator, timing means deenergized during an initial heating period, a device responsive to the first-mentioned means on the attainment of a predetermined work temperature and adapted to energize said timing means to terminate said initial period and initiate an adjustment period and control mechanism adapted to adjust said regulator in accordance with the heater and work temperature measurements of the first mentioned means during said initial period and including means cooperating with said timing means to adjust said regulator in joint response to said temperature measurements and to the operation of said timing means during said adjustment period.

19. In controlling the supply of heat to a heater by and in accordance with measurements of the temperature of the heater and of work heated therein, the method which consists in regulating the heat supply to the heater in response to the heater temperature while the work temperature is below a predetermined value, and in regulating the heat supply in response to the temperature of said heater when the temperature of the latter exceeds a predetermined degree, and in regulating the heat supply in response to the temperature of the work and so as to maintain the last mentioned temperature at a predetermined degree for a predetermined time following the attainment by said work of its said predetermined degree of temperature, and in thereafter regulating the heat supply to said heater to decrease the temperature of said work at a predetermined rate.

JOHN E. MacCONVILLE.
JAMES L. WHITTEN.
NEEL I. COCKLEY.